United States Patent

[11] 3,621,985

| | | |
|---|---|---|
| [72] | Inventor | Hans Karl Pelzer<br>Krefeld, Germany |
| [21] | Appl. No. | 846,374 |
| [22] | Filed | July 31, 1969 |
| [45] | Patented | Nov. 23, 1971 |
| [73] | Assignee | Fried, Krupp Gesellschaft mit beschrankter Haftung<br>Essen, Germany |
| [32] | Priority | Aug. 3, 1968 |
| [33] | | Germany |
| [31] | | P 17 56 927.6 |

[54] CONVEYOR BELT INSTALLATION
4 Claims, 16 Drawing Figs.

[52] U.S. Cl. ................................................... 198/192,
193/37, 193/35 F
[51] Int. Cl. ...................................................... B65g 15/08
[50] Field of Search .......................................... 198/192;
193/35 F, 37

[56] References Cited
UNITED STATES PATENTS

| | | | |
|---|---|---|---|
| 1,422,662 | 7/1922 | Bylger ........................... | 198/192 |
| 3,219,177 | 11/1965 | Reilly ............................ | 198/192 |
| 3,240,321 | 3/1966 | Lo Presti et al ............... | 198/192 |

Primary Examiner—Harvey C. Hornsby
Assistant Examiner—Merle F. Maffei
Attorney—Walter Becker ABSTRACT: A conveyor belt assembly with garland roller sets in which the garland joints are so designed that at a standstill of the conveyor belt, the lateral rollers of each garland roller set under the influence of gravity are inclined relative to the direction of movement of the conveyor belt, the said incline being at least nearly eliminated by the frictional engagement of the belt with the rollers during the normal conveying speed of said belt.

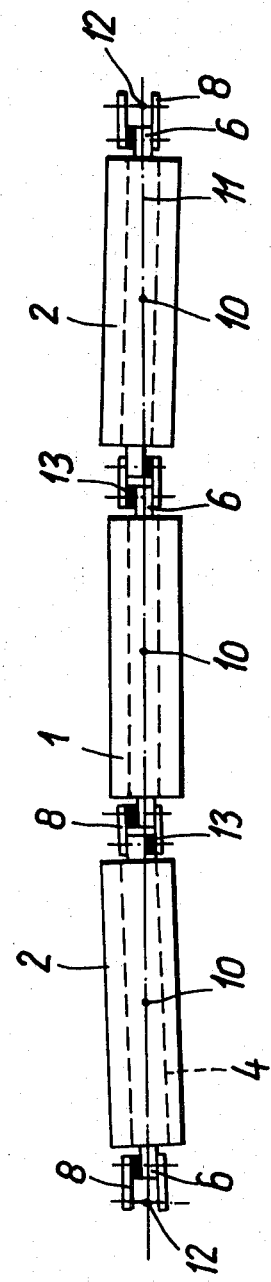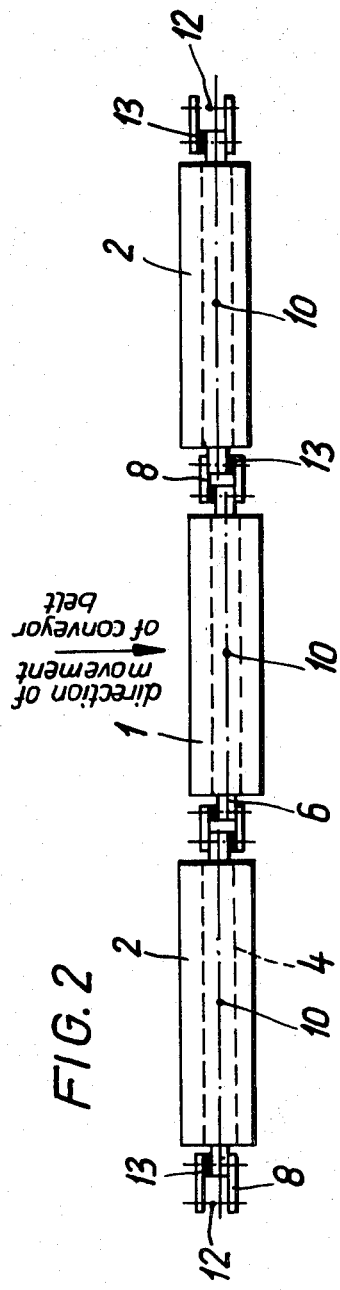

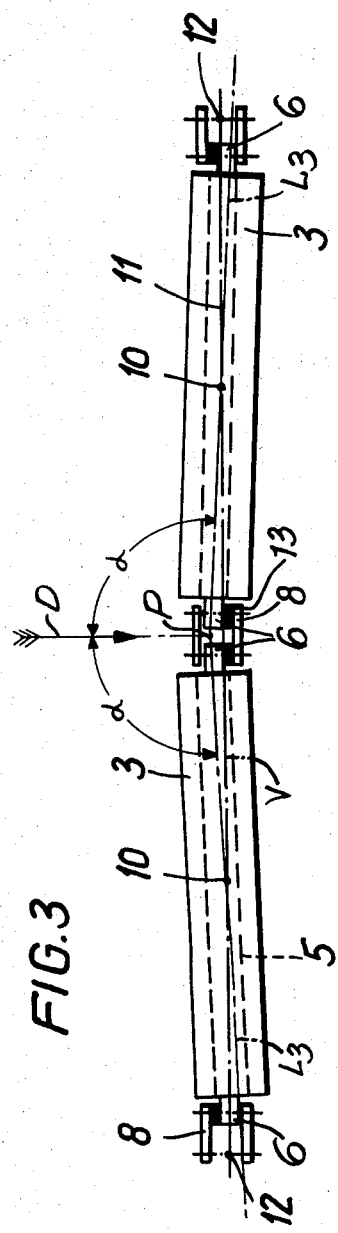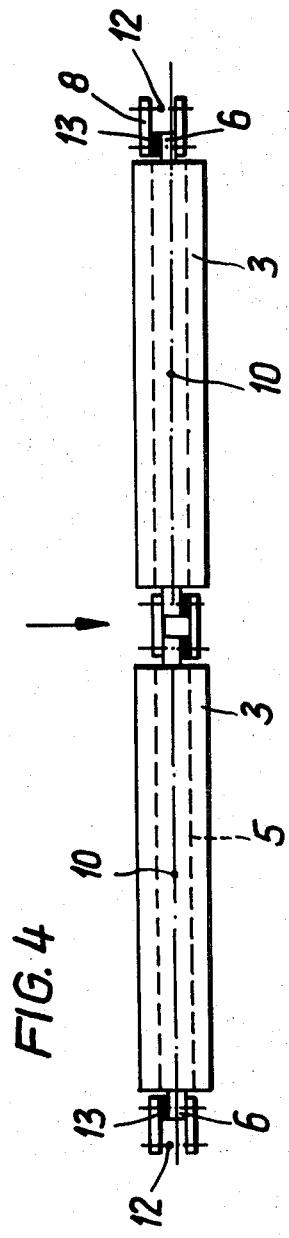

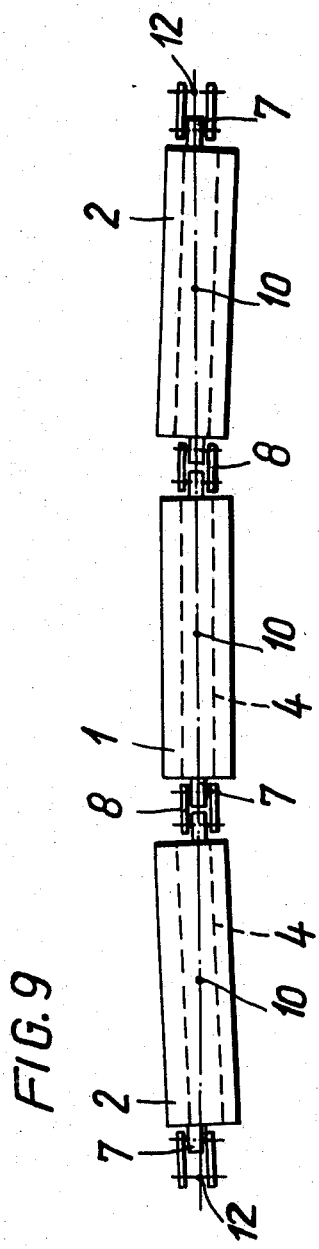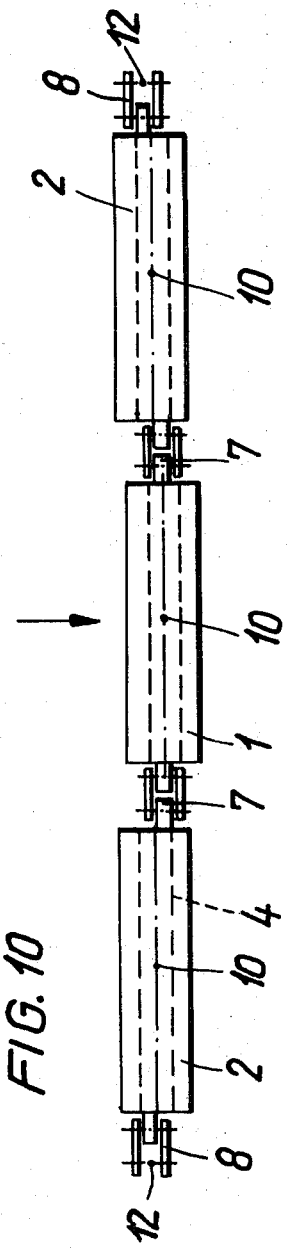

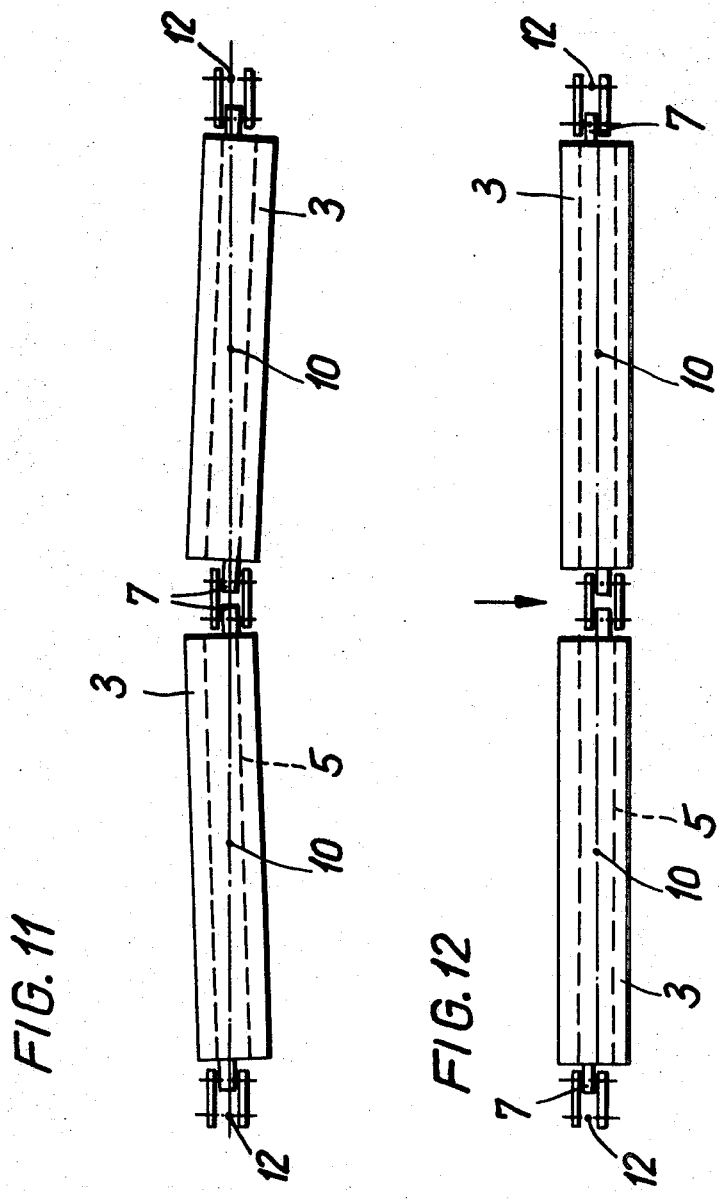

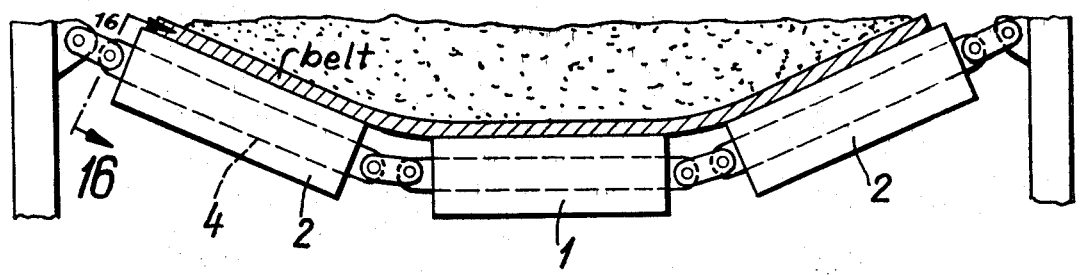
FIG. 15
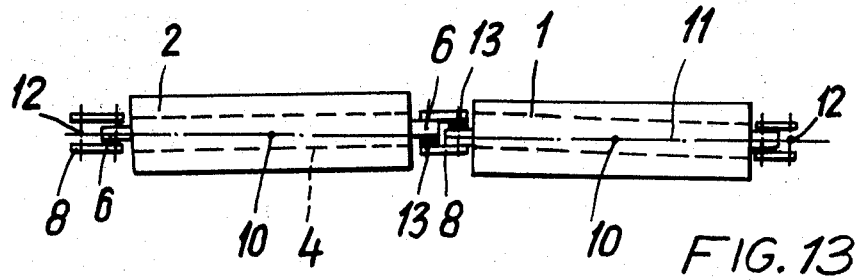
FIG. 13
FIG. 14
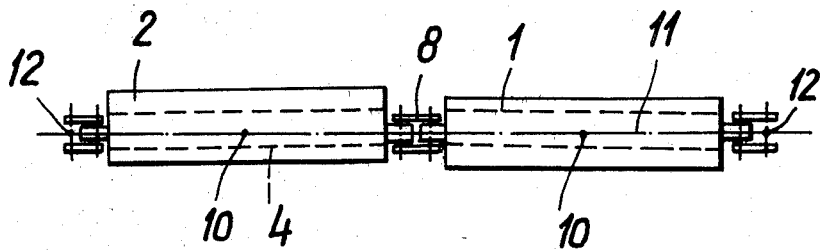
FIG. 16
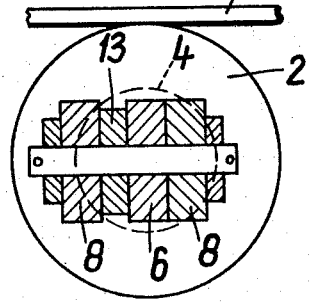

CONVEYOR BELT INSTALLATION

The present invention relates to conveyor belt installation. In conveyor belt installation employing garland roller sets, the roller sets are so suspended that when the conveyor belt is at a standstill, the individual rollers of each set, when viewed from above extend rectilinearly. In this connection, thus the center lines of all rollers of a set are located in a vertical plane the projection of which forms a right angle with the direction of movement of the conveyor belt. When the conveyor belt is running, due to the bearing friction, the intermediate roller of each set is taken along in conformity with the movability of the garland. Accordingly, the lateral rollers of each set occupy a position at an incline with regard to the direction of movement of the conveyor belt which means a drop or incline occurs with regard to the lateral rollers. Consequently, relative movements occur between the conveyor belt and the lateral rollers, which fact brings about friction losses and an increased wear of the conveyor belt. Moreover, the said drop of incline of the lateral rollers may cause an oblique movement of the conveyor belt, at least when the belt moves along a horizontal plane or downwardly.

In order to obviate these drawbacks, it is known to hold the joints between the individual rollers of the garland roller set by cables or the like in order to prevent the lateral rollers from occupying an inclined position under the influence of the moving conveyor belt. Such devices, however, are relatively expensive and furthermore prevent the garland from escaping or deviating in the running direction if the conveyor belt should be subjected to a sudden load.

It is, therefore, an object of the present invention to provide a conveyor belt installation which will overcome the above-mentioned drawbacks.

It is another object of this invention to provide a conveyor installation which will be free from the above outlined drawbacks without being affected in any way with respect to the yieldability of the garlands in running direction.

These and other objects and advantages of the invention will appear more clearly from the following specification in connection with the accompanying drawings, in which:

FIGS. 1, 3, 5, 7, 9, 11, 13 and 14 illustrate a top view of various garland roller sets with the assumption that the nonillustrated conveyor belt is at a standstill.

FIGS. 2, 4, 6, 8, 10 and 12 show a top view of the garland roller sets of FIGS. 1, 3, 5, 7, 9 and 11 with the assumption that the nonillustrated conveyor belt is in motion.

Figure 5:
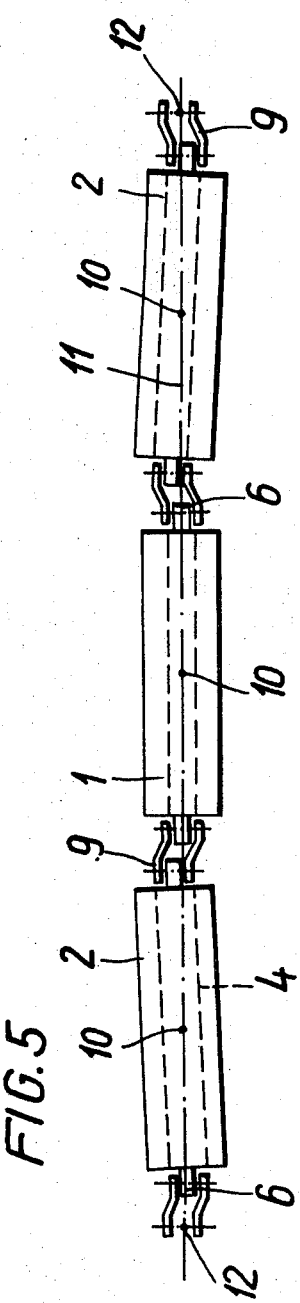

The conveyor belt installation with garland roller sets according to the present invention is characterized primarily in that the garland joints are so designed that when the conveyor belt is at a standstill, the lateral rollers of each garland roller set will in view of the influence of gravity have such a drop or incline that it is at least approximately eliminated by the dragging force of the running conveyor belt. This may be effected for instance in such a way that at least one end of a roller axis is offset relative to the center of the joint by means of an intermediate layer or by cranking the joint fishplates. However, it is also possible that each axle of a lateral roller has at least at one end a joint connection which is offset relative to the center line of the lateral roller.

Referring now to the drawings in detail, with all embodiments shown in the drawings, the individual rollers of the garland, i.e., with a three-member garland, the intermediate roller 1 and the two lateral rollers 2, and with a two-member garland, the two lateral rollers 3, are rotatably journaled on an axle or shaft 4 and 5 respectively. Each shaft 4, 5 has its end provided with connecting members 6 or 7 which protrude from the roller and which together with fishplates 8 or 9 form the garland joints. Between each two rollers 1, 2 or 3, 3, the garland joints are formed by interconnecting the two connecting members 6 or 7 by means of two fishplates 8 or 9 through the intervention of joint bolts or pins which are indicated by their centerlines and extend substantially parallel to the direction of movement of the conveyor belt. At the ends of the garland, the connecting members 6 or 7 of the lateral rollers 2 or 3 are by means of two fishplates 8 or 9 each connected to the supporting structure of the conveyor belt installation by means of joint bolts or pins which in conformity with the illustrated centerlines likewise are located substantially parallel to the direction of movement of the conveyor belt.

Figures 7, 8:
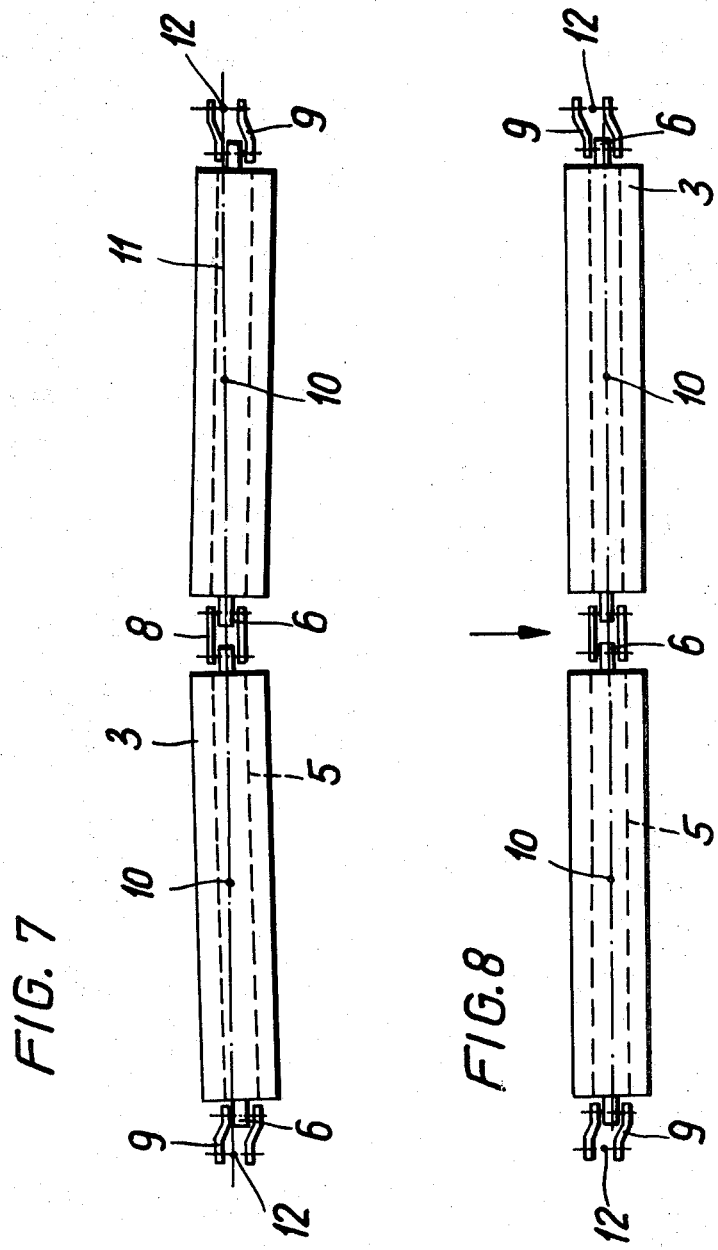

Therefore, the garlands are able in a manner known per se to oscillate between their suspension areas in a direction transverse to the direction of movement of the conveyor belt. Moreover, the garlands are able in view of a certain play in the garland joints to deflect to a certain extent in the direction of movement of the conveyor belt. The particular feature of the design according to the present invention consists in that when the conveyor belt is at a standstill, the individual rollers 1, 2 or 1, 2 and 3 of each garland are not parallel to each other but the lateral rollers, as indicated in FIGS. 1, 3, 5, 7, 9, 11 and 14 have a certain drop or incline which means are located at an incline with regard to the direction of movement of the conveyor belt. This, however, is not brought about by devices acting from the outside upon the garlands but is caused simply by the novel design of the garland joints which novel design brings about that solely under the effect of the force of gravity, the above mentioned inclination of the lateral rollers is obtained. The centers of gravity 10 of the individual rollers of each garland are located in a common vertical plane the projection 11 of which is located at a right angle to the direction of movement of the conveyor belt. This vertical plane also passes through the suspension points 12 of the garland.

With the embodiment illustrated in FIGS. 1 to 4, the inclined position of the lateral rollers 2, 3 at the standstill of the conveyor belt is obtained by the fact that in the garland joints, the connecting members 6 which are located coaxially on the roller axles or shaft 10 are offset relative to the centers of the garland joints. This is brought about by means of plates 13 of which one each is inserted between a connecting member 6 and a fishplate 8. These plates or discs 13 have bores and with play extend around the respective joint bolts or pins.

Figure 6:
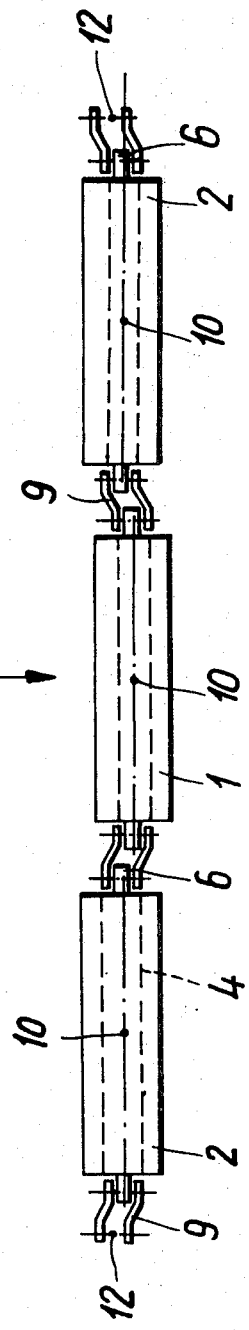

With the embodiments illustrated in FIGS. 5–8, the connecting member 6 which are located coaxially on the roller shafts 4 are offset relative to the centers of the garland joints by a corresponding crank in the fishplates 9.

With the embodiments of FIGS. 9–12, the inclined position of the lateral rollers 2, 3 when the conveyor belt is at a standstill is brought about by the fact that the connecting members 7 of the lateral rollers are offset relative to each and relative to the center lines of the lateral rollers. In contradistinction to these rollers, with three-member garlands according to FIGS. 9 and 10, the connecting members 7 are coaxially arranged on the roller shaft 4 of the central roller 1.

In each instance, the garland joints are so designed that when the conveyor belt is at a standstill, the garland when viewed from above is slightly bulged in a direction opposite to the direction of movement of the conveyor belt, such that an obtuse angle is formed between the centerlines of adjacent rollers as shown in FIG. 3. When the conveyor belt moves in the direction of the arrows shown in FIGS. 2, 4, 6, 8 and 10, the conveyor belt will in view of the friction take along the rollers 1, 2, 3 to such an extent that their centerlines are parallel to each other and form a right angle with the direction of movement of the conveyor belt. Since, accordingly, the lateral rollers 2, 3 extend no longer at an angle of incline with regard to the direction of movement of the conveyor belt, no harmful relative movement exists between the conveyor belt and the rollers. This is reflected in the life of the conveyor and in a reduction in the wear of the rollers. Furthermore, a deflection of the conveyor belt is aided by the inclination or drop of the lateral rollers.

In some instances, it will suffice for obtaining the said drop or inclination of the lateral rollers during the standstill of the conveyor belt to effect a corresponding design of the garland joints on one end face of each lateral roller only. Thus, FIG. 13 illustrates that the inclination or drop of a lateral roller 2 will be obtained by providing discs 13 only in the garland joint between the rollers 2 and 1 but not at the other end of the lateral roller 2. Furthermore, FIG. 14 illustrates that for purposes of inclining the lateral roller 2 it will suffice to offset only the connecting member 7 arranged on one side of said roller 2, on the roller shaft 4 relative to the center line. In a corresponding manner, and in modifying the embodiments of FIGS. 5 and 6, it is not necessary to provide the garland joints with cranked fishplates at both sides of a lateral roller 2.

When a conveyor installation is operated over relatively long idling periods, it should be taken into consideration that the running conveyor belt when under load will cause the garlands to oscillate to a greater extent than when the conveyor belt is under no load. In such an instance, the garland joints should be so designed that when the conveyor belt is at a standstill, the lateral rollers have a shorter drop or are less inclined than is the case if the operation is to be considered only when the conveyor belt is under load. In such an instance, neither with the conveyor belt under load nor with the conveyor belt under no load can an inclination of the lateral rollers be completely avoided. However, it can be arranged that in both instances the inclination will be so minor that it will, for all practical purposes, not be harmful even over a longer period of time.

The invention is also applicable when the conveyor belt does not move along a horizontal plane but at an incline upwardly or downwardly. In such instances, by correspondingly designing the garland joints, care is to be taken to the effect that the drop or inclination of the lateral rollers as it occurs with the conveyor belt at a standstill will at least approximately be caused to disappear when the movement of the conveyor belt is started, taking into consideration the inclined position of the lateral rollers in view of the inclination of the conveyor belt.

The invention is also applicable when the lower section of the conveyor belt is supported by garland roller sets.

The connecting members 6, 7 of the rollers may be formed for instance by flattening the roller axles 4, 5 or by axle journals extended thereto.

It is, of course, to be understood that the present invention is, by no means, limited to the particular constructions shown in the drawings but also comprises any modifications within the scope of the appended claims.

FIG. 15 is a cross section through the belt with an elevation of a garland roller set according to FIG. 1 and 2.

FIG. 16 is a cross section along line 16—16 in FIG. 15.

What I claim is:

1. A conveyor having a conveyor belt carried by garland roller sets, in which individual rollers are journaled with supporting structure upon axes interconnected with each other by joint means each joint means including connecting members which fit on the roller axes, fishplate connector means and pivot pins joined with said connecting members and support structure so that individual rollers can swing transverse to the direction of movement of said conveyor belt, such play existing between the pivot pins and said connecting members as well as said fishplate connector means that the individual rollers can swing parallel to the direction of movement of said conveyor belt as far as to a predetermined angle relative to each other and relative to suspension points thereof, at least one of said joint means being unsymmetrical with respect to at least one vertical plane which lies through centerline of one individual roller connected thereto, so that at a standstill of said conveyor belt under influence of gravity the centers of gravity of individual rollers lie in said vertical plane coinciding with the conveyor suspension points and at least one of those rollers located laterally outwardly of said joint means having an axis in vertical projection upon a horizontal plane from an obtuse angle with the direction of movement of said conveyor belt, when said belt is at a standstill.

2. A conveyor according to claim 1, which includes shaft means respectively rotatably supporting the rollers of a roller set, and which also includes washer means associated with at least one end of the shaft means pertaining to at least one of the rollers of the respective roller set and axially offsetting the axis of said last-mentioned shaft means relative to the respective adjacent joint means.

3. A conveyor according to claim 1, which includes shaft means respectively rotatably supporting the rollers of a roller set, and in which each of said joint means includes plate means arranged at opposite sides of the respective adjacent end of the respective adjacent shaft means, the plate means of at least one of said joint means being bent into cranked relationship to offset the respective adjacent end of said shaft means relative to the respective adjacent joint means.

4. A conveyor according to claim in which includes shaft means respectively rotatably supporting the rollers of a roller set, and in which at least one of said shaft means has at least one end thereof provided with extension means eccentrically arranged thereon and forming part of the pertaining adjacent joint means.

* * * * *